| United States Patent [19] | [11] Patent Number: 4,762,878 |
| Takeda et al. | [45] Date of Patent: Aug. 9, 1988 |

[54] POLYMER COMPOSITION AND THE USE THEREOF

[75] Inventors: Masami Takeda, Otake; Tsuneaki Muro, Iwakuni, both of Japan

[73] Assignee: Mitsui Petrochemical Industries, Ltd., Tokyo, Japan

[21] Appl. No.: 22,446

[22] PCT Filed: May 21, 1986

[86] PCT No.: PCT/JP86/00259
§ 371 Date: Jan. 16, 1987
§ 102(e) Date: Jan. 16, 1987

[87] PCT Pub. No.: WO86/07079
PCT Pub. Date: Dec. 4, 1986

[30] Foreign Application Priority Data

May 21, 1985 [JP] Japan .............................. 60-107048

[51] Int. Cl.$^4$ .............................................. C08K 5/011
[52] U.S. Cl. ................................... 524/490; 524/474; 524/491; 526/346; 526/347
[58] Field of Search ................................ 524/490, 491

[56] References Cited

U.S. PATENT DOCUMENTS 4,503,187  3/1985  Gunesin et al. ...................... 525/98

FOREIGN PATENT DOCUMENTS 087548  8/1974  Japan .................................. 526/346

*Primary Examiner*—Jacob Ziegler
*Attorney, Agent, or Firm*—Armstrong, Nikaido, Marmelstein & Kubovcik

[57] ABSTRACT

A polymer composition comprising:
(A) 15 to 40% by weight of a hydrogenated product of a block copolymer comprising a vinyl aromatic compound ($a_1$) and a conjugated diene compound ($a_2$),
(B) 4 to 30% by weight of an isopropenyltoluene polymer comprising meta-iso-propenyltoluene as the main constituting unit, and
(C) 40 to 80% by weight of a compound selected from the group consisting of α-olefin polymers ($c_1$) having a number average molecular weight ranging from 250 to 5000 and squalane ($c_2$), wherein the total amount of the components (A), (B) and (C) is 100% by weight.

3 Claims, No Drawings

POLYMER COMPOSITION AND THE USE THEREOF

TECHNICAL FIELD

The present invention relates to a polymer composition useful as a coating material for an optical fiber or as a hot melt adhesive.

BACKGROUND ART

Various coating materials have been used on optical fibers, for maintaining the strength of the fibers and protecting them from microbending, which induces optical loss. These materials include those which are cured by UV-ray or heat after being coated on the fibers, and those which are cured by evaporation of the solvent after coating with a material containing a solvent, as the main materials. Recently, however, for improving the workability in the coating step or physical properties of the coating material, as pointed out in Japanese unexamined patent publication (Kokai) No. 58-100102, hot melt materials have been used.

Also, there has been a demand for hot melt adhesives, in general, having an excellent adhesiveness at lower temperatures. The above mentioned Japanese unexamined patent publication (Kokai) No. 58-100102, proposed a hot melt composition which can be advantageously applied for optical fiber, but it did not have a sufficiently small modulus at low temperatures, which is an important physical property of the coating material for an optical fiber for the prevention of optical loss by microbending, and a coating material superior in various other points has been sought.

DISCLOSURE OF THE INVENTION

The present inventors have investigated hot melt coating materials under such circumstances, and consequently found that a specific novel polymer composition retains or improves most of the various advantageous hot melt materials for optical fiber of the prior art, and further avoids microbending loss, and thus the present invention was completed.

Further, it has been found that adhesiveness at lower temperatures can be remarkably improved by using this polymer composition as a conventional hot melt adhesive, whereby the invention as a hot melt adhesive was created.

SUMMARY OF THE INVENTION

The essence of the present invention resides in a polymer composition which comprises (A) 15 to 40% by weight of a hydrogenated product of a block copolymer comprising a vinyl aromatic compound ($a_1$) and a conjugated diene compound ($a_2$), (B) 4 to 30% by weight of an isopropenyltoluene polymer comprising meta-isopropenyltoluene as the main constituting unit, and (C) 40 to 80% by weight of a compound selected from the group consisting of $\alpha$-olefin polymers ($c_1$) having number average molecular weight of 250 to 5000 and squalane ($c_2$), the total of the components (A), (B) and (C) is 100% by weight. The essence of the present invention also resides in a coating material for optical fiber containing said composition as the component and a hot melt adhesive containing said composition as the component.

Component (A)

The component (A) usable in the present invention is a hydrogenated product of a block copolymer comprising a vinyl aromatic compound ($a_1$) and a conjugated diene compound ($a_2$). The block copolymer is preferably linear, but may be radial or branched.

Examples of the vinyl aromatic compound are styrene, $\alpha$-methylstyrene, vinyltoluene, p-tert-butylstyrene, vinylxylene, ethylvinylxylene, vinylnaphthalene, and mixtures thereof. Among them, styrene is particularly preferred. On the other hand, conjugated diene compounds may be exemplified by 1,3-butadiene, isoprene, 1,3-pentadiene, 2,3-dimethylbutadiene, halogenated derivatives thereof and mixtures thereof. Among them, butadiene or a combination of conjugated diene compounds composed mainly of butadiene is preferred, and particularly, butadiene is most preferable.

The block copolymer comprising a vinyl aromatic compound and a conjugated diene compound usable as the starting material for the hydrogenated product includes, for example, block copolymers as disclosed in Japanese unexamined patent publication (Kokai) No. 52-150457 or No. 53-71158, including those with the constitutions of $X-Y-X^1$, $X-Y$, etc., in which X and $X^1$ are blocks comprising vinyl aromatic compound and Y is a block comprising a conjugated diene compound (wherein X and $X^1$ may be the same or different), or further those with the constitutions of $X-Y-X-Y)_nX$, $X-Y-X)_nY$ (n is an integer of 1 to 10). Of these block copolymers, the terminal block is preferably a block comprising a vinylaromatic compound. The block copolymer may have a number average molecular weight of preferably about 10000 to about 1000000, more preferably about 20000 to about 300000. Also, each block comprising a vinylaromatic compound may have an average molecular weight of preferably about 1000 to about 500000, particularly preferably about 2000 to about 300000, and each block comprising a conjugated diene compound may have an average molecular weight of preferably about 1000 to about 500000, particularly preferably about 2000 to about 300000.

Furthermore, the weight ratio of the vinylaromatic compound to the conjugated diene compound in these block copolymers is preferably about 2/98 to about 60/40, particularly preferably about 10/90 to about 40/60.

In the present invention, hydrogenated products obtained by hydrogenation of these block copolymers are used.

In the case of hydrogenating block copolymers of a vinylaromatic compound and a conjugated diene compound, those having 90% or more of the aliphatic double bonds hydrogenated and 10% or less of the aromatic double bonds hydrogenated are preferred. Particularly preferable are those having 99% or more of the aliphatic double bonds hydrogenated and 5% or less of the aromatic double bonds hydrogenated.

The hydrogenation can be carried out by using methods known to those skilled in the art. Examples of the hydrogenation catalyst may include, for example, nickel porous diatomaceous earth, Raney nickel, copper dichromate, molybdenum sulfide, and further, those having platinum or palladium metal supported on carriers such as carbon. Hydrogenation can be carried out under any desired pressure and temperature, for example, under atmospheric pressure to 300 atm., generally from 5 to 200 atm., at a temperature of from 24° C. to 320° C., for 0.1 to 24 hours, preferably from 0.2 to 10 hours.

Specific examples of the copolymer comprising a vinylaromatic compound on the conjugated diene compound may include butadiene-polystyrene-block copolymer, polystyrene-polyisoprene-polystyrene-block copolymer, poly($\alpha$-methylstyrene)-polybutadiene-poly($\alpha$-methylstyrene)-block copolymer, etc. As these copolymers, commercial products can be also used, and the hydrogenated product itself is also commercially available. Examples of these may include:

Kaliflex TR-1101, TR1107, TR4113
  Shell Chemical Co.
Kraton G-6500, G6521, G1650, G1652
  Shell Chemical Co.
Solprene, hydrogenated Solprene
  Phillips Co.

Component (B)

The component (B) usable in the present invention is an isopropenyltoluene polymer containing metaisopropenyltoluene as the main constituting unit. As the polymer, preferably those described, for example, in Japanese unexamined patent publication (Kokai) No. 51-17225 can be used.

That is, the polymers are preferably those having a number average molecular weight of 400 to 1600, a ratio of number average molecular weight to weight average molecular weight of 3.0 or less, and a softening point (ring and ball method, JIS (i.e., Japanese Industrial Standard) K-2531) of 90° C. to 160° C. obtained by polymerization of meta-isopropenyltoluene alone or a mixture of isopropenyltoluene isomers containing 50% or more of meta-isopropenyltoluene in the presence of a Friedel-Krafts catalyst. More preferably, the polymers are those having a number average molecular weight of 600 to 1450, a ratio of number average molecular weight to weight average molecular weight of 2.5 or less and a softening point (ring and ball method, JIS K-2531) of 100° C. to 150° C.

As the polymer unit constituting the component (B), components other than isopropenyltoluene, for example, vinyltoluene, t-butylstyrene, t-butyl- -methylstyrene, styrene, $\alpha$-methylstyrene, may be also contained together in the polymer component. The content of these components is preferably 50 mol % or less.

Component (C)

Of the component (C) usable in the present invention, the component ($c_1$) includes an $\alpha$ olefin polymer, having a number average molecular weight of ranging from 250 to 5000, preferably 300 to 3000, more preferably from 300 to 1000.

This polymer may include homopolymers of $\alpha$-olefin, copolymers of $\alpha$-olefin and $\alpha$-olefin, or copolymers of $\alpha$-olefin with other monomers such as dienes, vinyl chloride, vinyl acetate, (meth)acrylic acid, etc., containing $\alpha$-olefin as the main component, but the former are preferred. Also, the component ($c_1$) preferably has a pour point (JIS K-2269) of 30° C. or lower, and further preferably, is liquid at a normal temperature (25° C.).

Examples of the above $\alpha$-olefin may include those having 2 to 20 carbon atoms, particularly preferably 2 to 12 carbon atoms, such as ethylene, propylene, 1butene, 1-pentene, 1-hexene, 1-octene, 1-decene, 1dodecene, 1-tetradecene, 1-octadecene, 1-eucocene, 4-methyl-1-pentene, and the like.

When a homopolymer of an $\alpha$-olefin is used as the component ($c_1$), it is further preferable to use one having 4 to 10 carbon atoms, particularly a polymer containing 1-butene, 1-pentene, 1-hexene, 1-octene, 1-decene as the monomer.

When a copolymer of $\alpha$-olefins is used, it is preferably a copolymer of ethylene and an $\alpha$-olefin other than ethylene, and examples of the $\alpha$-olefin in that case may include those having 3 to 12 carbon atoms such as propylene, 1-butene, 1-hexene, 1-octene, 1-decene, 1-dodecene, etc. In that case, the ethylene content is preferably 25 to 70 mol %, particularly 30 to 60 mol %. Further, the ratio of the weight average molecular weight and the number average molecular weight of the copolymer is preferably 4 or less, particularly 3 or less.

If the ethylene content is outside the above lower limit, the toughness is reduced when the composition of the present invention is used for an optical fiber coating material, and if it is outside the upper limit, the compatibility will decrease, and thus the melt viscosity will become higher. Similarly, if the number average molecular weight is outside the lower limit, the heating weight reduction during melting of the formulation becomes greater, and if it is outside the upper limit, the melt viscosity of the formulated product becomes higher and the workability is reduced.

Copolymers or homopolymers of the above-mentioned $\alpha$-olefin can be obtained according to a known method, for example, the method disclosed in Japanese unexamined patent publication (Kokai) No. 57-123205. Further, these copolymers also include modified (co-)polymers having an aromatic vinyl compound such as styrene; unsaturated carboxylic acid such as (meth)acrylic acid, maleic acid, maleic anhydride, or its derivative; an unsaturated silane compound such as vinyl trimethoxysilane; an unsaturated epoxy compound such as glycidyl (meth)acrylate; a halogen such as chlorine, bromine grafted thereon. These can be also used in the same way.

On the other hand, squalane ($c_2$) is obtained by hydrogenating squalene with a nickel catalyst. The starting material, squalene, is contained in liver oil derived from deep sea sharks, and it is obtained by subjecting the unsaponified product of shark liver oil to fractional distillation, deacidification and further fractional distillation in the presence of metallic sodium, or condensation of farnesyl chloride in the presence of metallic magnesium, or carrying out a Wittig reaction on transgeranyl acetone.

The component ($c_1$) and the component ($c_2$) can be used alone or as a mixture thereof in the composition of the present invention.

Mixing ratio of the respective components

The mixing ratio of the respective components is limited as specified above so as to be suitable when employed as the optical fiber coating material and the hot melt adhesive as described below. For more preferable ranges, the component (A) may be 22 to 33% by weight, particularly preferably 25 to 30% by weight, the component (B) 4 to 25% by weight, particularly preferably 4 to 7% by weight, and the component (C) 61 to 72% by weight, particularly 64 to 69% by weight.

Other components

The composition of the present invention can contain various other components, depending upon the use, in addition to the above components (A), (B) and (C).

One of the other components usable in the present invention may be a thermal oxidation stabilizer conventionally used in polymeric materials. For example, there may be employed phenol type thermal oxidation stabilizers such as monophenol type, bisphenol type, and polymeric phenol type; sulfur type thermal oxidation stabilizers, and phosphorus type thermal oxidation stabilizers. These thermal oxidation stabilizers are preferably contained when the composition of the present invention is used for the optical fiber coating material as described below.

The thermal oxidation stabilizer may be preferably used in an amount generally of 0.5 parts by weight to 1.7 parts by weight, particularly 0.8 parts by weight to 1.4 parts by weight per 100 parts by weight of the total of the above (A), (B), and (C).

Another optional component preferably used in the present invention is a wax. The wax herein mentioned may include various waxes such as paraffin type waxes, polyolefin type waxes, but is preferably one having a melting point (ASTM D-127) of 70 or higher.

The amount of wax employed may be 0 to 11 parts by weight per 100 parts by weight of the total of the components (A), (B), and (C).

Also, in the composition of the present invention, in addition to the above respective components, various known formulating agents such as weathering resistant stabilizers, aging preventives, lubricants, slip agents, antistatic agents, fillers, and pigments, may be further formulated within the range which does not impair the object of the present invention.

The method for preparing the composition of the present invention is not special, but a conventional device or method for the preparation of hot melt composition may be used.

Optical fiber coating material

The polymer composition of the present invention is particularly excellent as a coating material for an optical fiber. For applying a coating on an optical fiber, the fiber is passed through a reservoir of a coating material having an outlet orifice corresponding to a desired coating thickness. The coating step is performed at a considerably high speed in the fiber stretching line, and it is important that the viscosity of the hot melt coating material in the reservoir should be low. That is, the melt viscosity at 190° C. is required to be 10000 cps or lower. The composition of the present invention has a low viscosity when melted and is excellent in this point. Further, it has a good heat-resistance stability when melted and substantially no odor, which are characteristics not found in the hot melt type optical fiber coating material known in the art. The coating material on the optical fiber is solidified by cooling. In this case, the coating material of the present invention also has an excellent adhesion to the fiber. Further, the coated optical fiber is ordinarily wound up and, in this case, an absence of blocking between the fibers is sometimes important. The inclusion of wax in the coating material of the present invention is not necessarily essential, but if a coating material containing a wax is used, there is substantially no sticking after solidification, whereby the problem of blocking will not substantially occur.

As the properties of the coating material having an effect on the strength retentivity of the optical fiber, there may be included toughness, softening point, modulus at low temperature, and change in physical properties relative to the lapse of time. Among them, toughness is important for protection of the optical fiber (generally quartz) and is preferably 35 kg/cm$^2$ or higher according to the measurement method as described below. Also, the softening point exhibits creep resistance at high temperature, and is preferably as high as possible, preferably at least 100° C. or higher, according to the measurement method as described below. The modulus has a direct effect on optical loss by microbending, and is preferably $1 \times 10^8$ dyne/cm$^2$ or less ordinarily at −40° C., according to the measurement method described below. Further, a small change with the lapse of time, namely good weathering resistance, is required as a matter of course.

The above polymer composition of the present invention can be used generally in that state as the coating material for an optical fiber, and is an excellent product which can satisfy all of the requisite properties as mentioned above.

Hot melt adhesive

The above-mentioned composition of the present invention can be generally used as such for a conventional hot melt adhesive. That is, the respective components of the composition are stirred under heating to prepare a uniform melt liquid, which is molded into, for example, granules, flakes, pellets, and rods, depending on the uses under cooling. The hot melt adhesive composition is again provided for uses such as melting or coating. For example, when provided for adhesion, in corner adhesion of a molded article, a rod-shaped formulated product may be used by filling in, for example, a welding gun.

The hot melt adhesive of the present invention can be used as the adhesive or the coating agent generally in the field such as book making, can making, book working, laminate, sheet, and coating working.

The hot melt adhesive of the present invention has a particularly excellent adhesiveness at low temperatures, as shown in the Examples described below.

EXAMPLES

The present invention is described in more detail by referring to the following Examples, but the scope of the present invention is, of course, not limited to these Examples. The respective components used in the Examples are described below as reference Examples.

Reference Example 1

A 500 ml flask equipped with a thermometer and a stirrer was charged with 150 g of isopropenyltoluene (a mixture having a composition of 2% of ortho-isomer, 91% of meta-isomer and 6% of para-isomer) and 300 g of toluene, and 1.50 g of boron trifluoride-phenol complex was added dropwise over about 20 minutes under stirring while maintaining the temperature at −30° C. Further, after the reaction was continued at the same temperature for 2 hours, 75 g of 2% aqueous sodium hydroxide solution was added, and stirring was further continued for 30 minutes to decompose the catalyst.

Next, after the polymer solution was washed with water and neutralized, the solvent and unreacted monomer were evaporated at 215° C. and 10 mmHg to obtain a resin.

The resin yield was 136.6 g, the hue (G. No.) 1 or less, softening point 135° C., $\overline{M}n$ 1200, and $\overline{M}w/\overline{M}n$ 2.2.

Reference Example 2

A coumarone-indene copolymer: Cumar LX509, produced by Neville Chemical Co.

Reference Example 3

According to the method described in Japanese unexamined patent publication (Kokai) No. 57-123205, an ethylene-propylene random copolymer having an $\overline{Mn}$ of 800, $\overline{Mw}/\overline{Mn}$ of 1.4, pour point (° C., JIS K-2269) of $-50.0°$ C., dynamic viscosity at 100° C. (JIS K-2283) of 20 cst, specific gravity ($d_4^{20}$, Antonpar densitometer) of 0.830, and ethylene content of 50 mol % was obtained.

Reference example 4

According to the method described in Japanese unexamined patent publication (Kokai) No. 57-123205, an ethylene-propylene random copolymer having an $\overline{Mn}$ of 400, $\overline{Mw}/\overline{Mn}$ of 1.2, pour point (° C., JIS K-2269) of $-57.5°$ C., dynamic viscosity at 100° C. (JIS K-2283) of 4.55 cst, and ethylene content of 35 mol % was obtained.

Reference Example 5

A 2 liter glass reactor equipped with a nitrogen blowing pipe, a water cooling condenser, a thermometer, and two dropping funnels was charged with 800 g of an ethylene-propylene random copolymer having an ethylene mol composition of 50 mol %, number average molecular weight of 810, $\overline{Mw}/\overline{Mn}$ of 1.40, and [$\eta$] of 0.4 dl/g, and replaced with nitrogen for 2 hours to expel dissolved oxygen. Then, the inner temperature of the flask was raised to 145° C. and 200 g of styrene monomer and 40 g of di-tertbutyl peroxide previously charged respectively in the two dropping funnels were fed over 8 hours. After completion of the feeding, the reaction was further carried out for 4 hours, and thereafter, the temperature was raised so that the inner temperature in the flask became 180° C. and the volatile components were removed under a reduced pressure of 0.5 mmHg. Since the product obtained contained by-produced polystyrene mixed therein, it was purified by an activated clay treatment.

The purified styrene-modified ethylene-propylene random copolymer was a colorless transparent liquid having a [$\eta$] of 0.06 dl/g, $\overline{Mw}/\overline{Mn}$ of 1.88, and glass transition point (Tg) of $-78°$ C., and the grafted ratio of the styrene component measured by $^{13}$C-NMR analysis was found to be 24 parts by weight per 100 parts by weight of the liquid ethylene-propylene random copolymer.

Reference Example 6

Commercially available product squalane {$C_{30}H_{62}=422$, solidifying point $-63°$ C., specific gravity ($d_4^{20}$) 0.8098}.

Reference Example 7

According to the method described in Japanese unexamined patent publication (Kokai) No. 57-123205, an ethylene-butene random copolymer having an $\overline{Mn}$ of 940, $\overline{Mw}/\overline{Mn}$ of 1.2, pour point (° C., JIS K-2269) of $-35.0°$ C., dynamic viscosity at 100° C. (JIS K-2283) of 44.5 cst, and ethylene content of 45 mol % was obtained.

Reference Example 8

White mineral oil: trade name Drakeol 35, produced by Penreco, Penzoil Co.

EXAMPLES 1-5

To 25 parts by weight of a SEBS block copolymer ("Kraton G1650", produced by Shell Chemical), 5 parts by weight of the isopropenyltoluene resin described in Reference Example 1, 9 parts by weight of a wax ("Be Square 195", produced by Petrorite Co.), and 1 part by weight of a stabilizer ("Irganox 1010", produced by Ciba Geigy Co.), 60 parts each of the ethylene-α-olefin oligomers of Reference Examples 3–6 shown in Table 1 were formulated, and the mixture was melted (200° C.) and stirred in a kneading tank to prepare a formulated product. Next, the physical properties of these formulated products, as shown below, were measured (the results are shown in Table 1).

(1) Softening point: measured by the ring and ball method according to JIS K-2531.

(2) Melt viscosity (cps, at 190° C.): measured by Emilar rotatory viscometer.

(3) $-40°$ C. modulus (dyne/cm$^2$): dynamic modulus at $-40°$ C. (measuring frequency 35 Hz) was measured by RHEOVIBRON DDV-II-EA model produced by Toyo Baldwin.

(4) Adhesive force (g/1.0 mm width): For examination of adhesiveness with quartz fiber at room temperature, the formulated product was applied to a 50μ thickness on a 25μ polyester film, and the coated surfaces were mutually superimposed face to face for heat sealing (heat seal bar upper and lower surface temperature 120° C., pressure 3 kg/cm$^2$, 10 sec). Then, at a tensile speed of 300 mm/min, T-type peeling was performed (g/10 mm width, measuring temperature 25° C.). Although the adhesive force relative to quartz fiber is not the same as that relative to polyester, both surfaces have polar groups and, therefore, comparison therebetween is possible. Thus, in this case, for simplification of the test operation, the test was conducted with the polyester film.

(5) Toughness (kg/cm$^2$): defined as the area below the stress-strain curve obtained at a tensile speed of 225%/min (ASTM D-1708).

(6) Heat resistance (hue change): as the test method for heat resistance, a comparison was made of hue changes after heating the formulated product at 200° C. for 10 hours (o: good, Δ: slightly inferior, x: bad).

(7) Odor: the odor of the formulated product on melting at 200° C. was determined (o: good, Δ: slightly inferior, x: bad).

The above measurement results are shown in Table 1. Next, through a storage tank containing these formulated products and having an outlet orifice, a fiber with an outer diameter of 110 μm was passed to effect coating thereon. During this operation, it is required that there should be no great blocking in the coated fiber wound up on a reel, and the presence or absence of blocking in this test is shown in Table 1 (o: blocking absent, x: blocking present).

Comparative Example 1

Example 1 was repeated except for using 25 parts by weight of the SEBS block copolymer ("Kraton G1650", produced by Shell Chemical), 5 parts by weight of the coumarone-indene copolymer described in Reference Example 2, 9 parts by weight of the wax ("Be Square 195", produced by Petrorite Co.), 1 part by weight of the Stabilizer ("Irganox 1010", produced by Ciba Geigy Co.) and Drakeol 35, produced by Penreco. Penzoil Co. of Reference Example 8 shown in Table 1. The results are shown in Table 1.

As shown by the results in Table 1, the polymer composition obtained by the present invention had a smaller modulus at −40° C., compared with the Comparative Example, which means that optical loss by microbending under a low temperature (−40° C.) was smaller.

Also, compared with the Comparative Example, the polymer composition of the present invention had higher softening point and toughness values, thus providing excellent protection for and reducing mechanical damage to the fibers.

Also, the polymer composition of the present invention had an improved thermal stability and odor during coating of the fiber, compared with the Comparative Example, and was also free from blocking during wind-up.

From the above results, it has been found that the polymer composition of the present invention substantially retains or improves various advantageous points of the hot melt material for an optical fiber of the prior art, but avoids further microbending loss under low temperatures.

As the result of the above tests, it can be seen that the polymer composition of the present invention has an excellent performance also as a hot melt adhesive.

TABLE 2

|  | Example 6 | Example 7 | Comparative Example 2 |
|---|---|---|---|
| Formulated product used | Example 1 | Example 2 | Reference Example 8 |
| Adhesive physical property: | | | |
| 0° C. adhesive force (g/10 mm width) | 1700 | 1500 | 200 |
| 25° C. adhesive force (g/10 mm width) | 1400 | 1300 | 500 |
| 50° C. adhesive force (g/10 mm width) | 400 | 400 | 400 |

We claim:

1. A polymer composition comprising:
  (A) 15 to 40% by weight of a hydrogenated product of a block copolymer comprising a vinyl aromatic compound ($a_1$) and a conjugated diene compound ($a_2$);
  (B) 4 to 30% by weight of an isopropenyltoluene polymer comprising meta-isopropenyltoluene as the main constituting unit; and
  (C) 40 to 80% by weight of a compound selected from the group consisting of α-olefin polymers ($c_1$) having a number average molecular weight ranging from 250 to 5000 and squalane ($c_2$); the total amount of the components (A), (B) and (C) being 100% by weight.

TABLE 1

|  | Example 1 | Example 2 | Example 3 | Example 4 | Example 5 | Comparative Example 1 |
|---|---|---|---|---|---|---|
| Plasticizer employed | Reference Example 3 | Reference Example 4 | Reference Example 5 | Reference Example 6 | Reference Example 7 | Reference Example 8 |
| Amount of plasticizer used (weight parts) | 60 | 60 | 60 | 60 | 60 | 60 |
| Physical properties of formulated product: | | | | | | |
| Softening point (°C., ring and ball method) | >150 | 141.5 | >150 | 132.2 | >150 | 118.5 |
| Melt viscosity (CPS, at 190° C.) | 5700 | 3500 | 4400 | 2700 | 6000 | 2300 |
| Dynamic modulus at −40° C. (dyne/cm$^2$) | $9 \times 10^7$ | $8 \times 10^7$ | $7 \times 10^7$ | $5 \times 10^7$ | $9 \times 10^7$ | $4 \times 10^8$ |
| Adhesive force at 25° C. (g/10 mm width) | 1400 | 1300 | 1200 | 1100 | 1600 | 1000 |
| Toughness (kg/cm$^2$) | 80 | 75 | 75 | 70 | 85 | 35 |
| Blocking | o | o | o | o | o | o |
| Heat resistant stability | o | o | o | o | o | Δ |
| Odor | o | o | o | o | o | Δ |

Next, the polymer composition of the present invention, because of its excellent low temperature characteristics, exhibits an excellent performance as the hot melt adhesive for low temperatures, for which there is now a strong demand. This is described by referring to the following Examples and Comparative Examples.

EXAMPLE 6

The formulated product in Example 1 was measured at setting temperatures of 0°, 25° and 50° C. according to the adhesive force testing method described in Example 1.

EXAMPLE 7

Example 5 was repeated using the formulated product of Example 2.

COMPARATIVE EXAMPLE 2

Example 5 was repeated except for using "Aronemelt #912", produced by Toa Gosei Kagaku as the commercially available hot melt adhesive.

2. A coating material for optical fiber containing as the component a polymer composition comprising:
  (A) 15 to 40% by weight of a hydrogenated product of a block copolymer comprising a vinyl aromatic compound ($a_1$) and a conjugated diene compound ($a_2$);
  (B) 4 to 30% by weight of an isopropenyltoluene polymer comprising meta-isopropenyltoluene as the main constituting unit; and
  (C) 40 to 80% by weight of a compound selected from the group consisting of α-olefin polymers ($c_1$) having a number average molecular weight ranging from 250 to 5000 and squalane ($c_2$); the total amount of the components (A), (B) and (C) being 100% by weight.

3. A hot melt adhesive containing as the component a polymer composition comprising:

(A) 15 to 40% by weight of a hydrogenated product of a block copolymer comprising a vinyl aromatic compound ($a_1$) and a conjugated diene compound ($a_2$);
(B) 4 to 30% by weight of an isopropenyltoluene polymer comprising meta-isopropenyltoluene as the main constituting unit; and
(C) 40 to 80% by weight of a compound selected from the group consisting of α-olefin polymers ($c_1$) having a number average molecular weight ranging from 250 to 5000 and squalane ($c_2$), the toial amount of the components (A), (B) and (C) being 100% by weight.

* * * * *